US009733995B2

United States Patent
Cole et al.

(10) Patent No.: US 9,733,995 B2
(45) Date of Patent: Aug. 15, 2017

(54) SCALABLE SYNCHRONIZATION MECHANISM FOR DISTRIBUTED MEMORY

(71) Applicants: Clement T. Cole, Chelmford, MA (US); James Dinan, Hudson, MA (US); Gabriele Jost, Santa Clara, CA (US); Stanley C. Smith, Hillsboro, OR (US); Robert W. Wisniewski, Ossining, NY (US); Keith D. Underwood, Albuquerque, NM (US)

(72) Inventors: Clement T. Cole, Chelmford, MA (US); James Dinan, Hudson, MA (US); Gabriele Jost, Santa Clara, CA (US); Stanley C. Smith, Hillsboro, OR (US); Robert W. Wisniewski, Ossining, NY (US); Keith D. Underwood, Albuquerque, NM (US)

(73) Assignee: Intel Corporation, Santa Clara, CA (US)

( * ) Notice: Subject to any disclaimer, the term of this patent is extended or adjusted under 35 U.S.C. 154(b) by 150 days.

(21) Appl. No.: 14/573,133

(22) Filed: Dec. 17, 2014

(65) Prior Publication Data

US 2016/0179587 A1  Jun. 23, 2016

(51) Int. Cl.
*G06F 3/00* (2006.01)
*G06F 9/44* (2006.01)
*G06F 9/46* (2006.01)
*G06F 13/00* (2006.01)
*G06F 9/54* (2006.01)
*G06F 12/06* (2006.01)

(52) U.S. Cl.
CPC ............ *G06F 9/542* (2013.01); *G06F 12/06* (2013.01); *G06F 12/0692* (2013.01); *G06F 2212/1016* (2013.01)

(58) Field of Classification Search
CPC ........................................ G06F 9/542
USPC ........................................ 719/318
See application file for complete search history.

(56) References Cited

U.S. PATENT DOCUMENTS

| 6,665,700 B1 * | 12/2003 | Sugisaki ................ G06F 15/16 712/38 |
| 8,473,963 B2 | 6/2013 | Kottapalli et al. |
| 2010/0257510 A1 * | 10/2010 | Horley ................ G06F 11/3648 717/128 |
| 2014/0032828 A1 | 1/2014 | Khailany et al. |
| 2014/0281243 A1 * | 9/2014 | Shalf .................. G06F 12/0813 711/122 |

OTHER PUBLICATIONS

Alessandro Forin, "Design, implementation, and performance evaluation of a distributed shared memory server for Mach", 1998, pp. 1-22.*
PCT Search Report and Written Opinion, PCT/US2015/056656, Mar. 24, 2016, 16 pages.

* cited by examiner

*Primary Examiner* — Timothy A Mudrick
(74) *Attorney, Agent, or Firm* — Blakely, Sokoloff, Taylor & Zafman LLP

(57) ABSTRACT

A method comprising receiving control information at a first processing element from a second processing element, synchronizing objects within a shared global memory space of the first processing element with a shared global memory space of a second processing element in response to receiving the control information and generating a completion event indicating the first processing element has been synchronized with the second processing element.

26 Claims, 4 Drawing Sheets

SCALABLE SYNCHRONIZATION MECHANISM FOR DISTRIBUTED MEMORY

STATEMENT OF GOVERNMENT INTEREST

This invention was made with Government support under contract number H98230-13-D-0124 awarded by the Department of Defense. The Government has certain rights in this invention.

FIELD

Embodiments described herein generally relate to parallel computing. More particularly, embodiments relate to a data processing system having a global address space.

BACKGROUND

Enhanced computer system performance may typically be achieved by harnessing the processing power of multiple individual processing units. One common multi-processor (MP) architecture is the symmetric multi-processor (SMP) architecture in which multiple processing units (or elements) are supported by a multi-level cache hierarchy. In the SMP architecture processing elements share a common pool of resources (e.g., a system memory and input/output (I/O) subsystem) that are often coupled to a shared system interconnect.

Partitioned Global Address Space (PGAS) is a parallel programming model that assumes a global memory address space that is logically partitioned and a portion of it is local to each process or thread. In global address space programming models (e.g., the SHMEM library), synchronization between processing elements is accomplished through synchronization variables located within the global address space. However, this synchronization mechanism suffers from inefficient initiator-managed protocols in which an initiating processing element remotely manages the steps in synchronizing data accesses with a receiver processing element through structures located at the receiver, thus resulting in high latencies and low throughput.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

In the following description, numerous specific details are set forth. However, embodiments, as described herein, may be practiced without these specific details. In other instances, well-known circuits, structures and techniques have not been shown in details in order not to obscure the understanding of this description.

Figure 1:
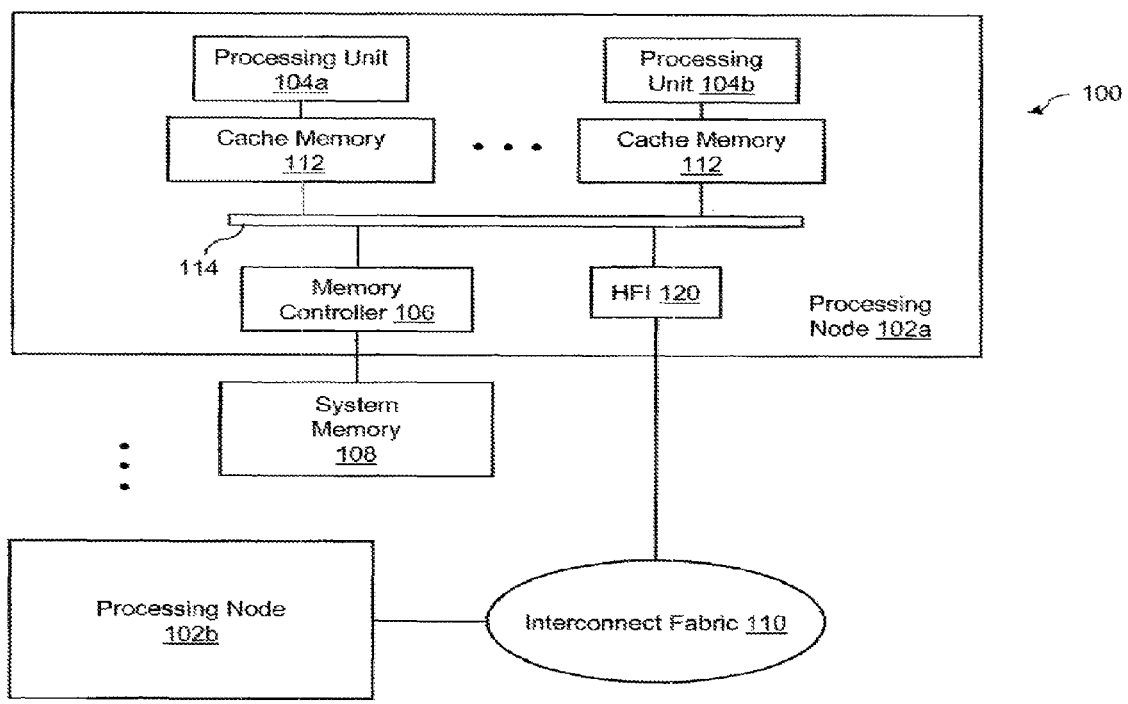
FIG. 1 illustrates one embodiment of a data processing system.

FIG. 1 illustrates one embodiment of a data processing system 100. Data processing system 100 includes multiple processing nodes 102a and 102b for processing data and instructions. In one embodiment, processing nodes 102 are coupled via a host fabric interface (HFI) to an interconnect fabric 110 that supports data communication between processing nodes 102 in accordance with one or more interconnect and/or network protocols. Interconnect fabric 110 may be implemented, for example, utilizing one or more buses, switches and/or networks.

As utilized herein, the term processing node (or node) is defined as the set of computing resources that form the domain of a coherent operating system (OS) image. For clarity, it should be understood that, depending on configuration, a single physical system may include multiple nodes. The number of processing nodes 102 deployed in a given system is implementation-dependent and can vary widely, for example, from a few nodes to many thousand nodes.

Each processing node 102 may be implemented, for example, as a single integrated circuit chip (e.g., system-on-a-chip (SOC)), multi-chip module (MCM), or circuit board, which includes one or more processing units (or processing elements) 104 (e.g., processing units 104a, 104b) for processing instructions and data. According to one embodiment, each processing unit 104 may concurrently execute one or more hardware threads of execution.

In a further embodiment, each processing unit 104 is supported by cache memory 112, which may include one or more levels of in-line or lookaside cache. Cache memories 112 may provide processing units 104 with low latency access to instructions and data received from source(s) within the same processing node 102 and/or remote processing node(s) 102. The processing units 104 within each processing node 102 are coupled to a local interconnect 114, which may be implemented, for example, with one or more buses and/or switches. Local interconnect 114 is further coupled to HFI 120 to support data communication between processing nodes 102.

In one embodiment, processing nodes 102 include at least one memory controller 106, which may be coupled to local interconnect 114 to provide an interface to a respective physical system memory 108. In alternative embodiments, one or more memory controllers 106 may be coupled to interconnect fabric 110 or directly to a processing unit 104 rather than a local interconnect 114.

In further embodiments, processing system 100 may include additional non-illustrated components, such as interconnect bridges, non-volatile storage, ports for connection to networks or attached devices, etc. Because such additional components are not necessary for an understanding of the present invention, they are not illustrated in FIG. 1 or discussed further herein.

Figure 2:
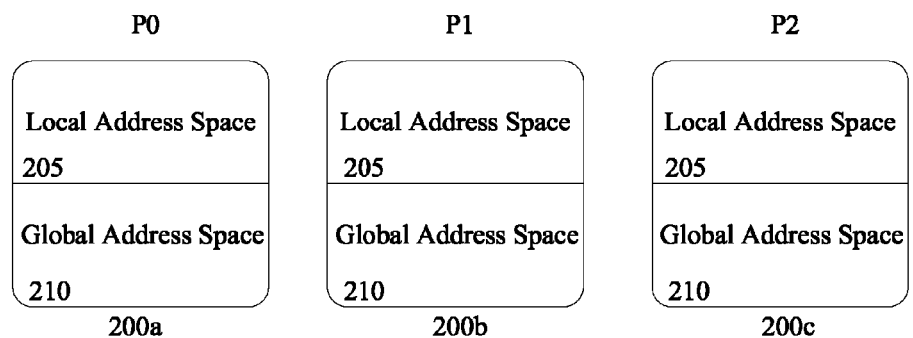
FIG. 2 illustrates one embodiment of a PGAS programming model.

In one embodiment, processing system 100 implements PGAS models. FIG. 2 illustrates one embodiment of a PGAS programming model. As shown in FIG. 2, each processing element 200 (e.g., 200a, 200b and 200c) includes a local address memory space 205 and a global address memory space 210. Local address memory space 205 includes private memory for local data items at each respective processing element 200, while global address space 210 at each processing element 200 comprises shared memory for globally shared data values. A processing element 200 may directly access any data item within the shared memory space with a single address despite the shared memory being partitioned among the cooperating processing elements 200, where each processing element 200 contributes memory the shared global memory.

In one embodiment, the shared memory component includes both a shared heap, for dynamically allocated shared objects, and a shared data segment, which allows statically declared objects to be accessed by remote processing elements. Objects in a shared segment may be symmetric, meaning that an instance of the object is accessible at every processing element, and that the object can be accessed using the address of the corresponding symmetric object in the local processing element's address space. Thus, when accessing data in the global address space, the target address is the pair including the destination processing element rank and the symmetric address. Remote accesses are performed using one-sided get and put data copy operations that transfer data between local and remote buffers.

Figure 3:
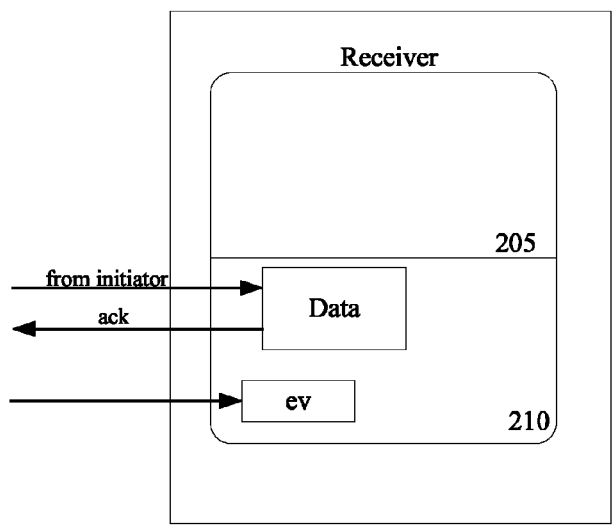
FIG. 3 illustrates a processing element implementing a conventional initiator managed synchronization.

FIG. 3 illustrates an exemplary initiator managed synchronization mechanism implemented at a receiver processing element 300 in which an initiator processing element is required to perform a remote update of data at the receiver processing element 300 and ensure that data is visible to the receiver (e.g. by waiting for an acknowledgement). Subsequently, the initiator must remotely update a synchronization object (e.g. event object, (ev)). This process ensures that data is visible to the receiver. However, remotely updating the synchronization object is inefficient, resulting in low communication efficiency.

According to one embodiment, processing system 100 implements communication events or notifications provided by a low-level communication interface (e.g., portals or counters) to enable a receiver processing element 200 to perform asynchronous, one-sided communication operations on data stored in a partitioned global address space 210. In such an embodiment, a synchronization extension is provided (counting puts) that utilizes network-level events to provide efficient point-to-point synchronization. In one embodiment, counting one-sided communication (e.g., counting puts) utilizes communication completion events to inform receiver processing element 200 that it has been the target of a one-sided communication operation, and that the data written is available to read; thus enabling receiver-side synchronization. In one embodiment, a completion event may be represented by a count of a number of messages received. However in other embodiments a completion event may be represented by a number of bytes received.

In one embodiment, receiver processing element 200 performs local synchronization actions on its structures when data has arrived, as well as generate an application-visible event. Further, the receiver managed synchronization mechanism extends distributed memory, global address space parallel programming models with a scalable and efficient "No-Remote-Memory-Access" (NORMA) method for synchronization between processing elements. In such an embodiment, an initiator processing element 200 transmits control information to notify a receiver processing element 200 of data availability, and structures that must be updated. Upon receipt of the information the communication subsystem at the receiver processing element 200 automatically generates a synchronization event that can be observed by an application running at the receiver processing element 200 when the initiator's transfer has completed.

Figure 4:
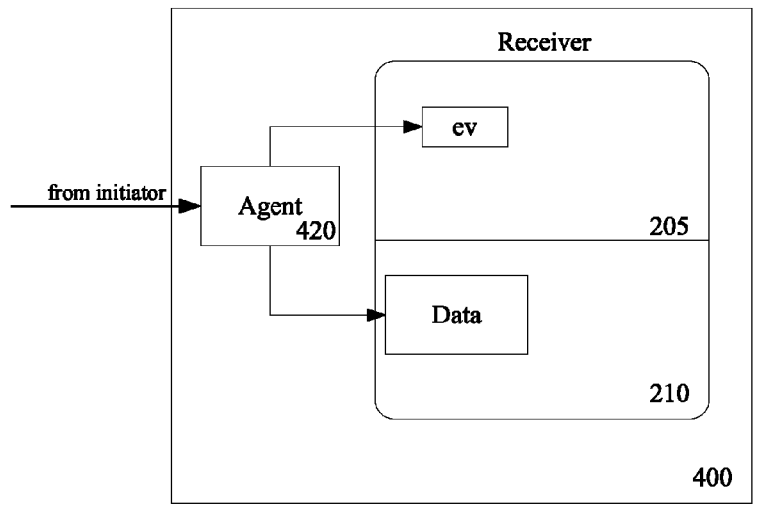
FIG. 4 illustrates one embodiment of a processing element.

FIG. 4 illustrates one embodiment of a receiver managed synchronization mechanism that provides for asynchronous, one-sided communication operations at a processing element 400. In this embodiment, processing element 400 includes an agent 420 to receive control information from an initiator processing element. Subsequently, agent 420 generates an application-visible communication completion event, which in turn writes the data to structures at shared memory space 210. In one embodiment, the application-visible communication completion event is generated by updating a synchronization event object (ev) upon completion of the data transfer.

In one embodiment, agent 420 is implemented in hardware (e.g., using HFI managed communication completion counters). However in other embodiments, agent 420 is implemented as system software, or a combination of hardware and software, that processes communication completion events generated by the fabric and updates user-facing synchronization objects. According to one embodiment, the synchronization object is stored in private memory space 205.

Figure 5:
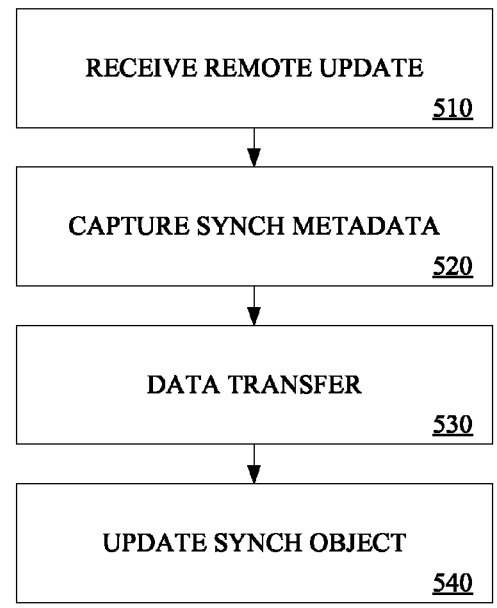
FIG. 5 is a flow diagram illustrating one embodiment of receiver managed synchronization.

FIG. 5 is a flow diagram illustrating one embodiment of a receiver managed synchronization mechanism. At processing block 510, an initiator processing element performs a remote update at receiver processing element 400. In one embodiment, the remote update includes the communication completion event as synchronization metadata within control data that is embedded with the message. At processing block 520, agent 420 at receiver processing element 400 captures the synchronization metadata. At processing block 530, agent 420 writes data to shared memory space 210 as part of the data transfer. At processing block 540, agent 420 updates a corresponding synchronization object upon completion of the data transfer.

Figure 6:
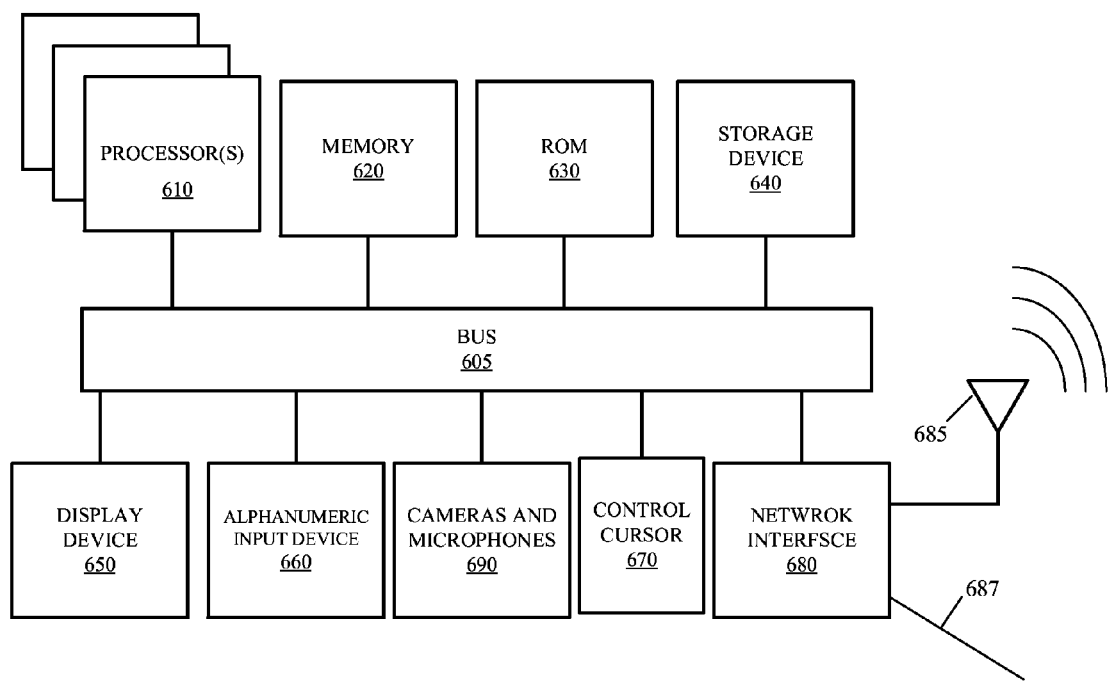
FIG. 6 illustrates a computer system suitable for implementing embodiments of the present disclosure according to one embodiment.

FIG. 6 illustrates an embodiment of a computing system 600. Computing system 600 represents a range of computing and electronic devices (wired or wireless) including, for example, desktop computing systems, laptop computing systems, cellular telephones, personal digital assistants (PDAs) including cellular-enabled PDAs, set top boxes, smartphones, tablets, etc. Alternate computing systems may include more, fewer and/or different components. Computing device 600 may be the same as or similar to or include processing system 100, as described in reference to FIG. 1.

Computing system 600 includes bus 605 (or, for example, a link, an interconnect, or another type of communication device or interface to communicate information) and processor 610 coupled to bus 605 that may process information. While computing system 600 is illustrated with a single processor, electronic system 600 and may include multiple processors and/or co-processors, such as one or more of central processors, graphics processors, and physics processors, etc. Computing system 600 may further include random access memory (RAM) or other dynamic storage device 620 (referred to as main memory), coupled to bus 605 and may store information and instructions that may be executed by processor 610. Main memory 620 may also be used to store temporary variables or other intermediate information during execution of instructions by processor 610.

Computing system 600 may also include read only memory (ROM) and/or other storage device 630 coupled to bus 605 that may store static information and instructions for processor 610. Data storage device 640 may be coupled to bus 605 to store information and instructions. Data storage device 640, such as magnetic disk or optical disc and corresponding drive may be coupled to computing system 600.

Computing system 600 may also be coupled via bus 605 to display device 650, such as a cathode ray tube (CRT), liquid crystal display (LCD) or Organic Light Emitting Diode (OLED) array, to display information to a user. User input device 660, including alphanumeric and other keys, may be coupled to bus 605 to communicate information and command selections to processor 610. Another type of user input device 660 is cursor control 670, such as a mouse, a trackball, a touchscreen, a touchpad, or cursor direction keys to communicate direction information and command selections to processor 610 and to control cursor movement on display 650. Camera and microphone arrays 690 of computer system 600 may be coupled to bus 605 to observe gestures, record audio and video and to receive and transmit visual and audio commands.

Computing system 600 may further include network interface(s) 680 to provide access to a network, such as a local area network (LAN), a wide area network (WAN), a metropolitan area network (MAN), a personal area network (PAN), Bluetooth, a cloud network, a mobile network (e.g., 3$^{rd}$ Generation (3G), etc.), an intranet, the Internet, etc. Network interface(s) 680 may include, for example, a wireless network interface having antenna 685, which may represent one or more antenna(e). Network interface(s) 780 may also include, for example, a wired network interface to communicate with remote devices via network cable 687, which may be, for example, an Ethernet cable, a coaxial cable, a fiber optic cable, a serial cable, or a parallel cable.

Network interface(s) 680 may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported.

In addition to, or instead of, communication via the wireless LAN standards, network interface(s) 680 may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) 680 may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing system 600 may vary from implementation to implementation depending upon numerous factors, such as price constraints, performance requirements, technological improvements, or other circumstances. Examples of the electronic device or computer system 600 may include without limitation a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for facilitating hybrid communication according to embodiments and examples described herein.

Some embodiments pertain to Example 1 that includes a computer system comprising a first processing element including a memory device comprising a global address space to store globally shared data and a private address space to store data items local to the processing element, and an agent to receive control information from a second processing element and to generate a completion event indicating the first processing element has been synchronized with the second processing element.

Example 2 includes the subject matter of Example 1, wherein the completion event informs the first processing element that data has been accessed or updated at the global address space.

Example 3 includes the subject matter of Example 2, wherein the agent generates the completion event after the first processing element has accessed or updated the data to the global address space.

Example 4 includes the subject matter of Example 3, wherein the agent updates a synchronization event object after writing the data to the global address space.

Example 5 includes the subject matter of Example 4, wherein the event object is stored in the private address space.

Example 6 includes the subject matter of Example 1, wherein the agent comprises one or more counters.

Example 7 includes the subject matter of Example 1, wherein the communication completion event comprises synchronization metadata embedded within control data.

Other embodiments pertain to Example 8 that includes a method comprising receiving control information at a first processing element from a second processing element, synchronizing objects within a shared global memory space of the first processing element with a shared global memory space of a second processing element in response to receiving the control information and generating a completion event indicating the first processing element has been synchronized with the second processing element.

Example 9 includes the subject matter of Example 8, wherein the communication completion event informs the first processing element that data has been accessed or updated at the global address space.

Example 10 includes the subject matter of Example 9, wherein the agent generates the completion event after the first processing element has accessed or updated the data to the global address space.

Example 11 includes the subject matter of Example 10, wherein the event object is stored in the private address space.

Example 12 includes the subject matter of Example 8, wherein the agent comprises one or more counters.

Example 13 includes the subject matter of Example 8, wherein the communication completion event comprises synchronization metadata embedded within control data.

Other embodiments pertain to Example 14 that includes an apparatus comprising a first processing element including a first memory device comprising a first global address space to store globally shared data and a first private address space to store data items local to the processing element, an interface coupled to the first processing element and a second memory device coupled to the interface having a second global address space to store globally shared data and a second private address space to store data items local to the processing element, and an agent to receive control information from the first processing element and to generate a completion event indicating that the second global address space has been synchronized with the first global address space.

Example 15 includes the subject matter of Example 14, wherein the communication completion event informs the second processing element that data has been accessed or updated at the second global address space.

Example 16 includes the subject matter of Example 15, wherein the agent generates the completion event after the first processing element has accessed or updated the data to the second global address space.

Example 17 includes the subject matter of Example 16, wherein the agent updates a synchronization event object after writing the data to the second global address space.

Example 18 includes the subject matter of Example 17, wherein the event object is stored in the second global address space.

Example 19 includes the subject matter of Example 14, wherein the agent comprises one or more counters implemented by the interface.

Example 20 includes the subject matter of Example 14, wherein the communication completion event comprises synchronization metadata embedded within control data.

Other embodiments pertain to Example 21 that includes a computer readable medium having instructions, which when executed by a processor, cause the processor to perform receiving control information at a first processing element from a second processing element, synchronizing objects within a shared global memory space of the first processing element with a shared global memory space of a second processing element in response to receiving the control information and generating a completion event indicating the first processing element has been synchronized with the second processing element.

Example 22 includes the subject matter of Example 21, wherein the communication completion event informs the first processing element that data has been accessed or updated at the global address space.

Example 23 includes the subject matter of Example 22, wherein the agent generates the completion event after the first processing element has accessed or updated the data to the global address space.

Example 24 includes the subject matter of Example 23, wherein the event object is stored in the private address space.

Example 25 includes the subject matter of Example 21, wherein the agent comprises one or more counters.

Example 26 includes the subject matter of Example 21, wherein the communication completion event comprises synchronization metadata embedded within control data.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A computer system comprising:
   a first processing element, comprising:
      a memory device comprising:
         a global address space to store globally shared data; and
         a private address space to store data items local to the first processing element; and
      an agent to receive control information from a second processing element indicating data availability and to update the memory device at the global address space and to generate a completion event indicating the first processing element has been synchronized with the second processing element.

2. The computer system of claim 1 wherein the completion event informs the first processing element that data has been updated at the global address space.

3. The computer system of claim 2 wherein the agent generates the completion event after the first processing element has updated the data to the global address space.

4. The computer system of claim 3 wherein the agent updates a synchronization event object after writing the data to the global address space.

5. The computer system of claim 4 wherein the synchronization event object is stored in the private address space.

6. The computer system of claim 1 wherein the agent comprises one or more counters.

7. The computer system of claim 1 wherein the completion event comprises synchronization metadata embedded within control data.

8. A method comprising:
   receiving control information at a first processing element from a second processing element indicating data availability;
   synchronizing objects within a shared global memory space of the first processing element with a shared global memory space of a second processing element in response to receiving the control information; and
   generating a completion event indicating the first processing element has been synchronized with the second processing element.

9. The method of claim 8 wherein the completion event informs the first processing element that data has been updated at the global address space.

10. The method of claim 9 wherein the agent generates the completion event after the first processing element has updated the data to the global address space.

11. The method of claim 10 wherein the completion event object is stored in the private address space.

12. The method of claim 8 wherein the agent comprises one or more counters.

13. The method of claim 8 wherein the completion event comprises synchronization metadata embedded within control data.

14. An apparatus comprising:
   a first processing element, comprising:
      a first memory device comprising:
         a first global address space to store globally shared data; and
         a first private address space to store data items local to the first processing element;
      an interface coupled to the first processing element;
      a second memory device coupled to the interface, comprising:
         a second global address space to store globally shared data; and
         a second private address space to store data items local to the first processing element; and
      an agent to receive control information from the first processing element indicating data availability and to update the second memory device at the second global address space and to generate a completion event indicating that the second global address space has been synchronized with the first global address space.

15. The apparatus of claim 14 wherein the communication completion event informs the second processing element that data has been updated at the second global address space.

16. The apparatus of claim 15 wherein the agent generates the completion event after the first processing element has updated the data to the second global address space.

17. The apparatus of claim 16 wherein the agent updates a synchronization event object after writing the data to the second global address space.

18. The apparatus of claim 17 wherein the synchronization event object is stored in the second global address space.

19. The apparatus of claim 14 wherein the agent comprises one or more counters implemented by the interface.

20. The apparatus of claim 14 wherein the completion event comprises synchronization metadata embedded within control data.

21. A non-transitory computer readable medium having instructions, which when executed by a processor, cause the processor to perform:
   receiving control information at a first processing element from a second processing element indicating data availability;
   synchronizing objects within a shared global memory space of the first processing element with a shared global memory space of a second processing element in response to receiving the control information; and
   generating a completion event indicating the first processing element has been synchronized with the second processing element.

22. The computer readable medium of claim 21 wherein the completion event informs the first processing element that data has been updated at the global address space.

23. The computer readable medium of claim 22 wherein the agent generates the completion event after the first processing element has updated the data to the global address space.

24. The computer readable medium of claim 23 wherein the completion event object is stored in a private address space.

25. The computer readable medium of claim 21 wherein the agent comprises one or more counters.

26. The computer readable medium of claim 21 wherein the completion event comprises synchronization metadata embedded within control data.

* * * * *